(12) United States Patent
Chatterjee

(10) Patent No.: US 7,966,608 B2
(45) Date of Patent: Jun. 21, 2011

(54) METHOD AND APPARATUS FOR PROVIDING A COMPILER INTERFACE

(75) Inventor: Soumitra Chatterjee, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 1211 days.

(21) Appl. No.: 11/493,426

(22) Filed: Jul. 26, 2006

(65) Prior Publication Data

US 2007/0094649 A1 Apr. 26, 2007

(30) Foreign Application Priority Data

Oct. 26, 2005 (IN) .................. IN/2863/DEL/2005

(51) Int. Cl.
*G06F 9/44* (2006.01)
(52) U.S. Cl. ...................................................... 717/148
(58) Field of Classification Search ........... 717/140–148
See application file for complete search history.

(56) References Cited

U.S. PATENT DOCUMENTS

| | | | | | |
|---|---|---|---|---|---|
| 4,667,290 | A | * | 5/1987 | Goss et al. ................. | 717/147 |
| 5,313,635 | A | * | 5/1994 | Ishizuka et al. ............. | 717/173 |
| 5,761,512 | A | * | 6/1998 | Breslau et al. .............. | 717/140 |
| 5,881,289 | A | * | 3/1999 | Duggan et al. .............. | 717/145 |
| 6,295,641 | B1 | * | 9/2001 | Beadle et al. ............... | 717/148 |
| 6,520,410 | B2 | * | 2/2003 | Putman et al. .............. | 235/380 |
| 6,618,854 | B1 | * | 9/2003 | Mann ........................... | 717/124 |
| 6,684,388 | B1 | * | 1/2004 | Gupta et al. ................. | 717/136 |
| 6,851,108 | B1 | * | 2/2005 | Syme et al. .................. | 717/146 |
| 6,978,447 | B1 | * | 12/2005 | Okmianski ................... | 717/139 |
| 7,292,531 | B1 | * | 11/2007 | Hill ............................. | 370/230.1 |
| 7,296,264 | B2 | * | 11/2007 | Zatloukal et al. ............ | 717/143 |
| 7,346,897 | B2 | * | 3/2008 | Vargas ......................... | 717/137 |
| 7,389,492 | B2 | * | 6/2008 | Chupa et al. ................ | 717/106 |
| 7,461,371 | B2 | * | 12/2008 | Luo et al. .................... | 717/167 |
| 7,516,445 | B2 | * | 4/2009 | Maennel et al. ............. | 717/125 |
| 7,536,674 | B2 | * | 5/2009 | Jason et al. .................. | 717/106 |
| 7,650,599 | B2 | * | 1/2010 | Smith et al. ................. | 717/146 |
| 2002/0042909 | A1 | * | 4/2002 | Van Gageldonk et al. ... | 717/149 |
| 2003/0005425 | A1 | * | 1/2003 | Zee ............................. | 717/166 |
| 2004/0143823 | A1 | * | 7/2004 | Wei ............................. | 717/140 |
| 2005/0060500 | A1 | * | 3/2005 | Luo et al. .................... | 711/147 |
| 2006/0236310 | A1 | * | 10/2006 | Domeika et al. ............. | 717/140 |
| 2007/0061785 | A1 | * | 3/2007 | Prakash ....................... | 717/127 |

OTHER PUBLICATIONS

"Distcc, A Fast Free Distributed Compiler" Martin Pool, Verbatim, Dec. 2003. Pool.pdf.*
http://web.archive.org/web/*/http://wvvw.comeaucomputing.com/tryitout/, Jan. 23, 2005 4 pages.
http://web.archive.org/web/*/http://www.delorie.com/digpp/compile/, Jul. 1998 1 page.

* cited by examiner

*Primary Examiner* — Anna Deng

(57) ABSTRACT

A method of providing a compiler interface, the method comprising receiving compiler requirement data; selecting a machine in accordance with the compiler requirement data; and sending source code to the selected machine for compilation.

9 Claims, 4 Drawing Sheets

METHOD AND APPARATUS FOR PROVIDING A COMPILER INTERFACE

BACKGROUND OF INVENTION

A limitation with conventional compilers is that they run on a particular platform and have a fixed behavior. To be able to change any of this, the user typically has to find a machine with the required platform, install the required compiler, and then run the compilation. Furthermore, it may be necessary to uninstall any previous compilers already installed on the machine. However, it might be that the user does not have access rights to log into the machine with the desired platform. Further, the user might not have the required "privileges" to be able to uninstall/install the required compiler. It might also be possible that sufficient licenses are not available for the new installation of the desired compiler.

There are a few web-based compilers that do offer the option of compiling a given test case online. Some of the publicly available ones are:
Comeau
DJGPP

BRIEF DESCRIPTION OF THE DRAWINGS

Various embodiments of the invention will now be described by way of example with reference to the accompanying drawings, in which.

DETAILED DESCRIPTION OF THE INVENTION

Figure 1:
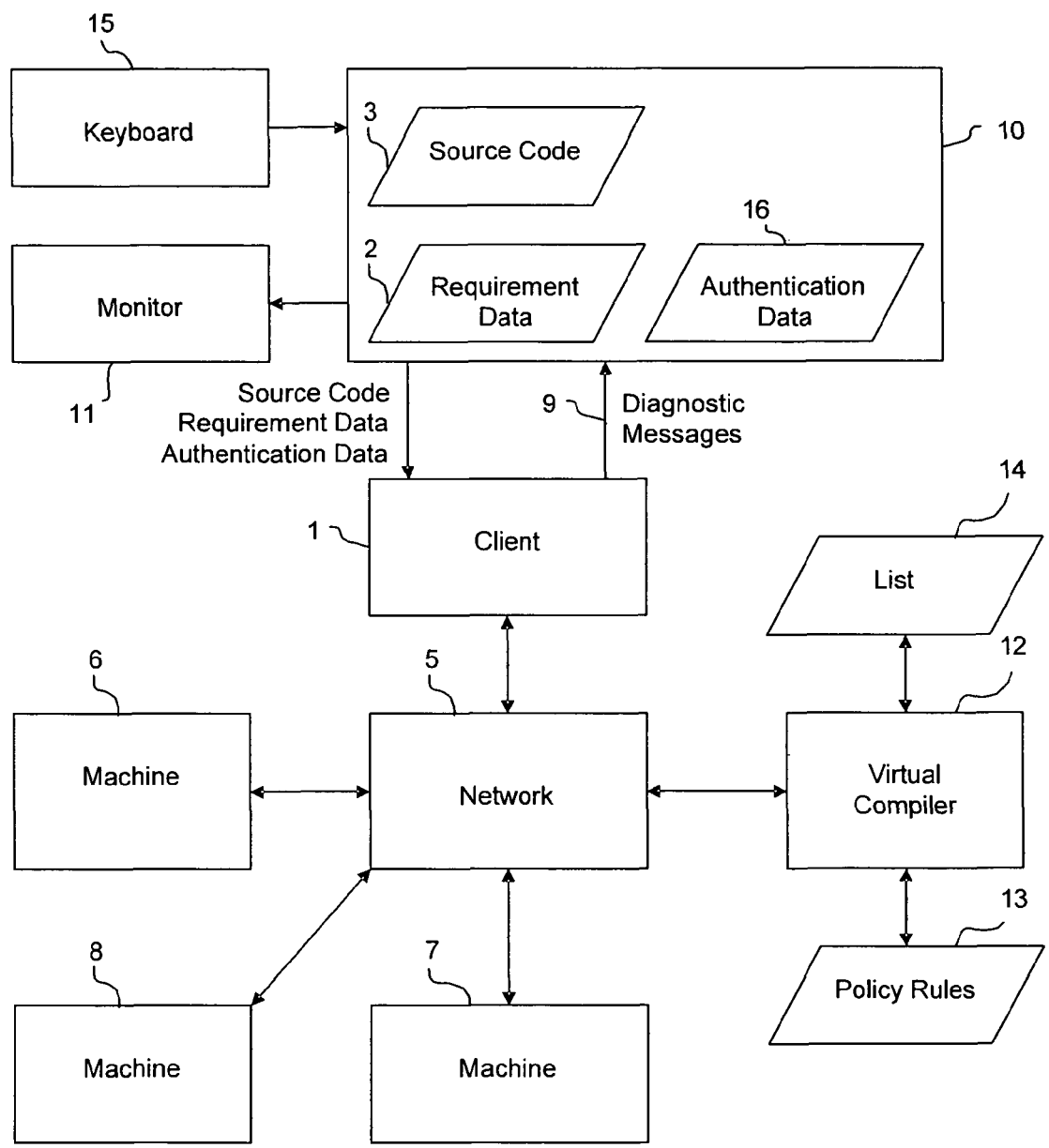
FIG. 1 is a schematic view of a first computer system, according to an embodiment of the invention.

Referring first to FIG. 1, a computer 10 has a keyboard 15, for receiving user input data, and a monitor 11. The user input data generates source code 3 and requirement data 2. The requirement data 2 can be generated using a variety of implementation dependent methods, including, but not limited to, drop-down menu selections or Unix command line options. According to one embodiment, the requirement data 2 specifies:
a platform (such as IPF/HP-UX)
a compiler (such as aCC)
a compiler version (such as A.03.52)

The source code 3, requirement data 2 and authentication data 16 are sent to a client 1 which forwards the source code 3 and requirement data 2 to a virtual compiler 12 via a network 5. The virtual compiler 12 is a stand alone utility which can select a machine, run the compiler on the source code, and return the compilation results back to the user, as described below.

The virtual compiler 12 maintains a list 14 which maps the requirement data against a list of available machines, and a set of policy rules 13. The virtual compiler selects a machine from the list 14 which satisfies the requirement data, that is, it has the specified version of the specified compiler installed to run on the specified platform. The selection may also be based on the policy rules 13. By way of example, a policy rule may require that if the list returns more than one available machine that satisfies the requirement data, then the virtual compiler selects the least loaded one of the selected machines. The policy rules may also determine the behavior of the virtual compiler if no machines satisfy the requirement data. For instance the policy rules may direct the virtual compiler to provide an error message or ignore the request.

The virtual compiler is implemented as a stand-alone utility that can select a machine based on the user's requirements, run the compiler on the source and then return the compilation results back to the user. The web browser acts as an interface to this mechanism. In the absence of a browser, some other means of gathering and forwarding the data would need to be installed on each machine.

The virtual compiler 12 then logs onto the selected machine via the network 5. Three machines 6, 7, 8 are shown in FIG. 1 for the purpose of illustration, but any number may be provided. The virtual compiler 12 logs onto a selected one of the machines 6-8, the logon process including a secure authentication procedure based on the authentication data 16 received from the machine 10. Example of such secure authentication procedures might be the 'rexec' mechanisms, which are present on Unix machines by default, and hence usually do not require any special adaptation.

The web browser 1 then forwards the source code 3 to the selected machine which performs the compilation. Thus, the web browser 1 is configured to receive the requirement data 2, select a machine in accordance with the requirement data 2, and send the source code to the selected machine for compilation.

Diagnostic messages 9 (if any) resulting from the compilation are then returned to the web browser 1 and forwarded to the machine 10 for displayed on the monitor 11 for a user's reference. An example of a diagnostic message is: "Error 20: /tmp/t20.c:syntax error".

In an alternative embodiment, the virtual compiler may forward point-of-contact data (for instance the IP address of the machine 10) to the selected machine 6-8. In this case, the diagnostic messages can be transmitted direct from machine 6-8, bypassing the virtual compiler.

The network 5 may be either the Internet (for intra-enterprise compiler sharing), an underlying LAN (within an enterprise), or any other type of network that allows for remote execution through authentication. The client 1 may be a standard web browser thereby providing a convenient web interface. However, the client 1 may also be any other device capable of communicating the data to the virtual compiler and the diagnostic messages back to the machine 10.

Thus, the virtual compiler 12 provides the user with the choice of compiling the source code 3 on a platform and compiler of his choice, without having to hunt for relevant machines and/or installing and uninstalling various compilers.

Another advantage of the virtual compiler is that it can, under some circumstances, save on licensing cost. Since users access the compiler using a web browser interface, only a single user account is used to run the compiler on the server, effectively improving the return on investment.

With the virtual compiler being available online, there is no need to have multiple machines with varying configurations or multiple installations for trying out code snippets across various compilers on different platforms.

Figure 2:
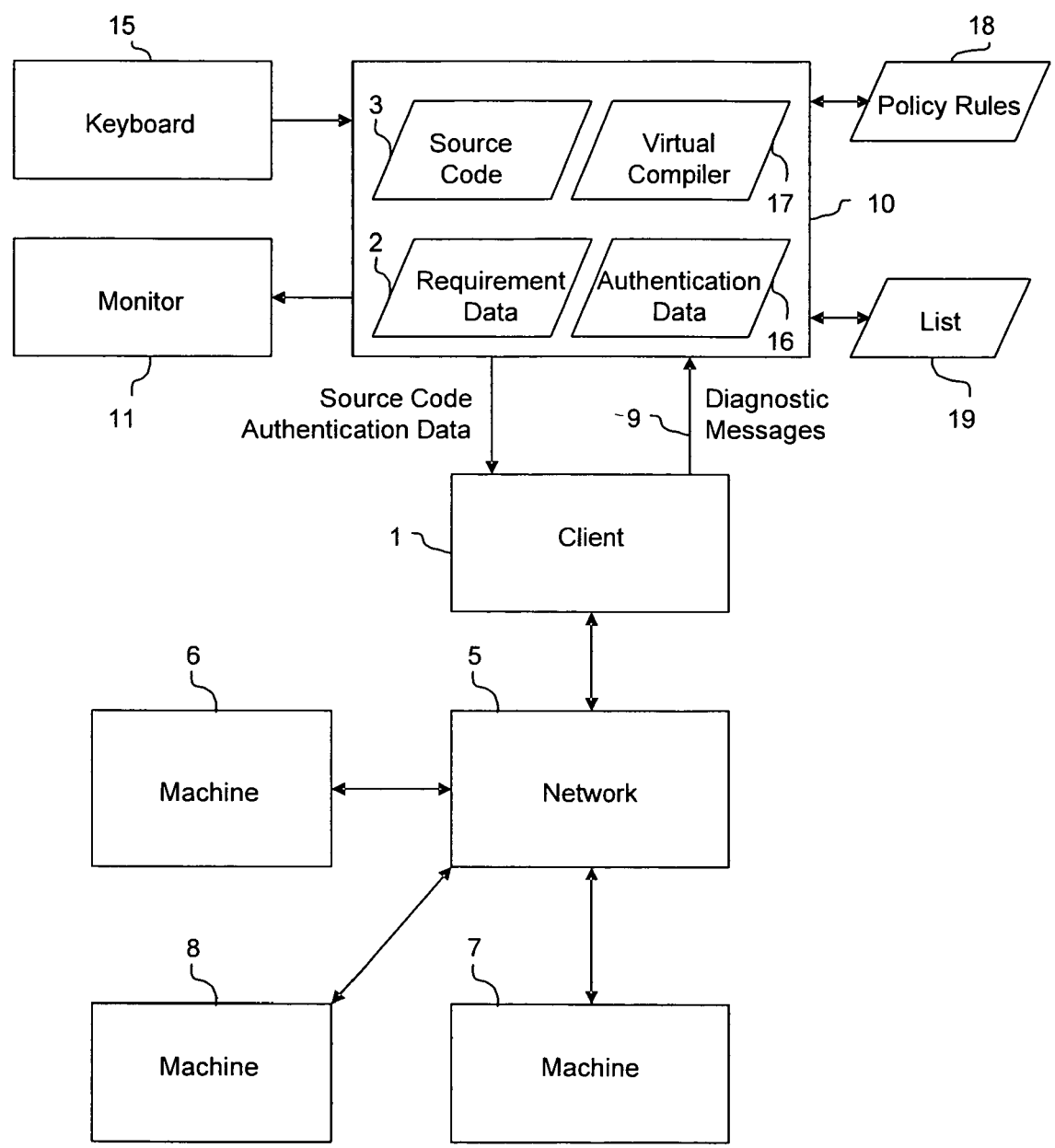
FIG. 2 is a schematic view of a second computer system, according to an embodiment of the invention.

A second embodiment of a computer system is shown in FIG. 2. For clarity, corresponding features are given the same reference numbers as in FIG. 1. In this case, instead of providing a virtual compiler online, a virtual compiler 17 is installed as a client on the machine 10. The virtual compiler 17 uses a list 18 and policy rules 19 in a similar manner to the online virtual compiler 12, to select a machine and forward the source code to the selected machine for compilation.

Figure 3:
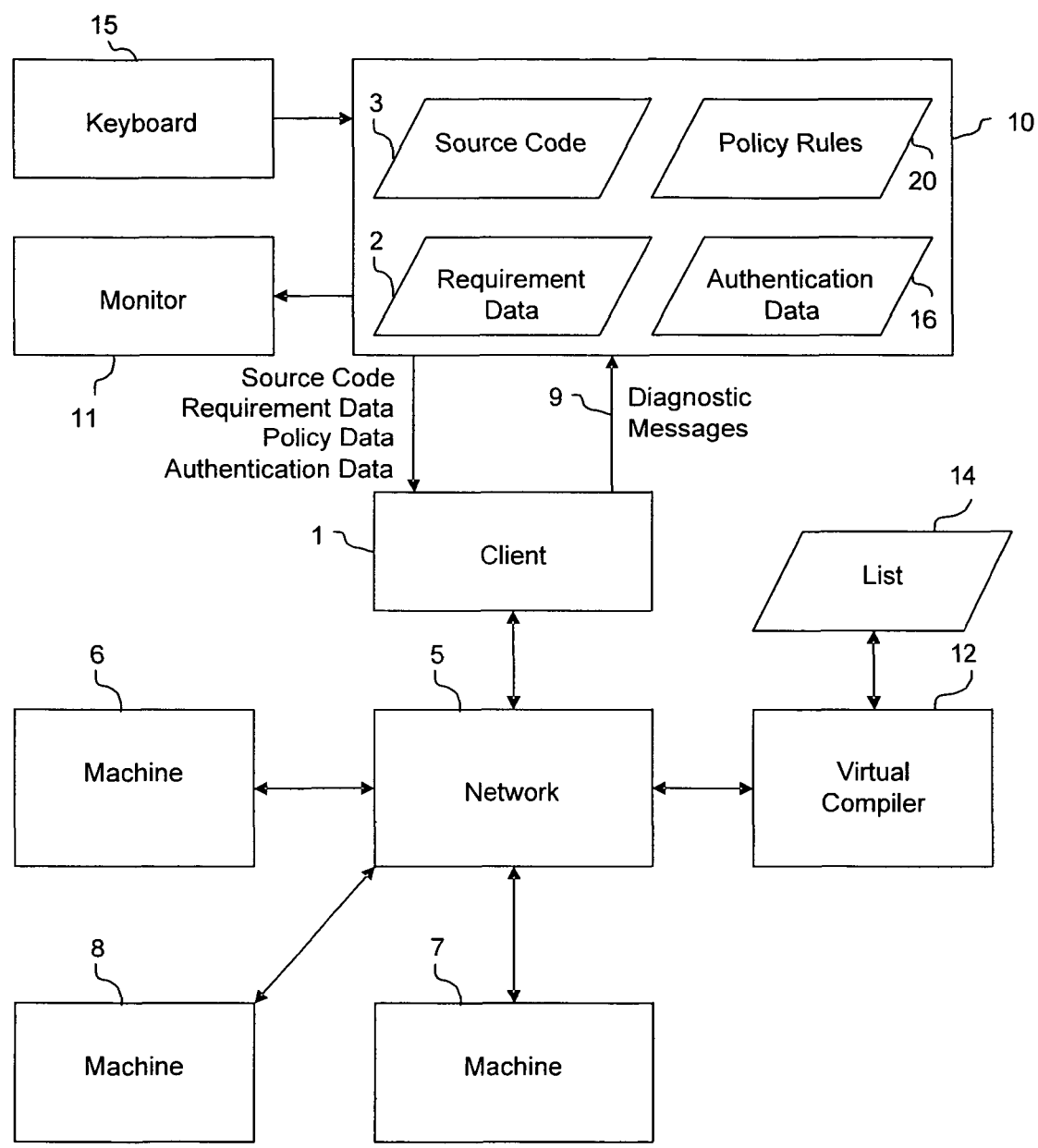
FIG. 3 is a schematic view of a third computer system, according to an embodiment of the invention.

A third embodiment of a computer system is shown in FIG. 3. Corresponding features are given the same reference numbers as in FIGS. 1 and 2. In this case, policy rules 20 are maintained by the machine 10 instead of the virtual compiler 12, and the policy rules are sent to the virtual compiler 12 along with the source code, requirement data and authentication data. This enables the virtual compiler 12 to implement different policies for different machines.

Figure 4:
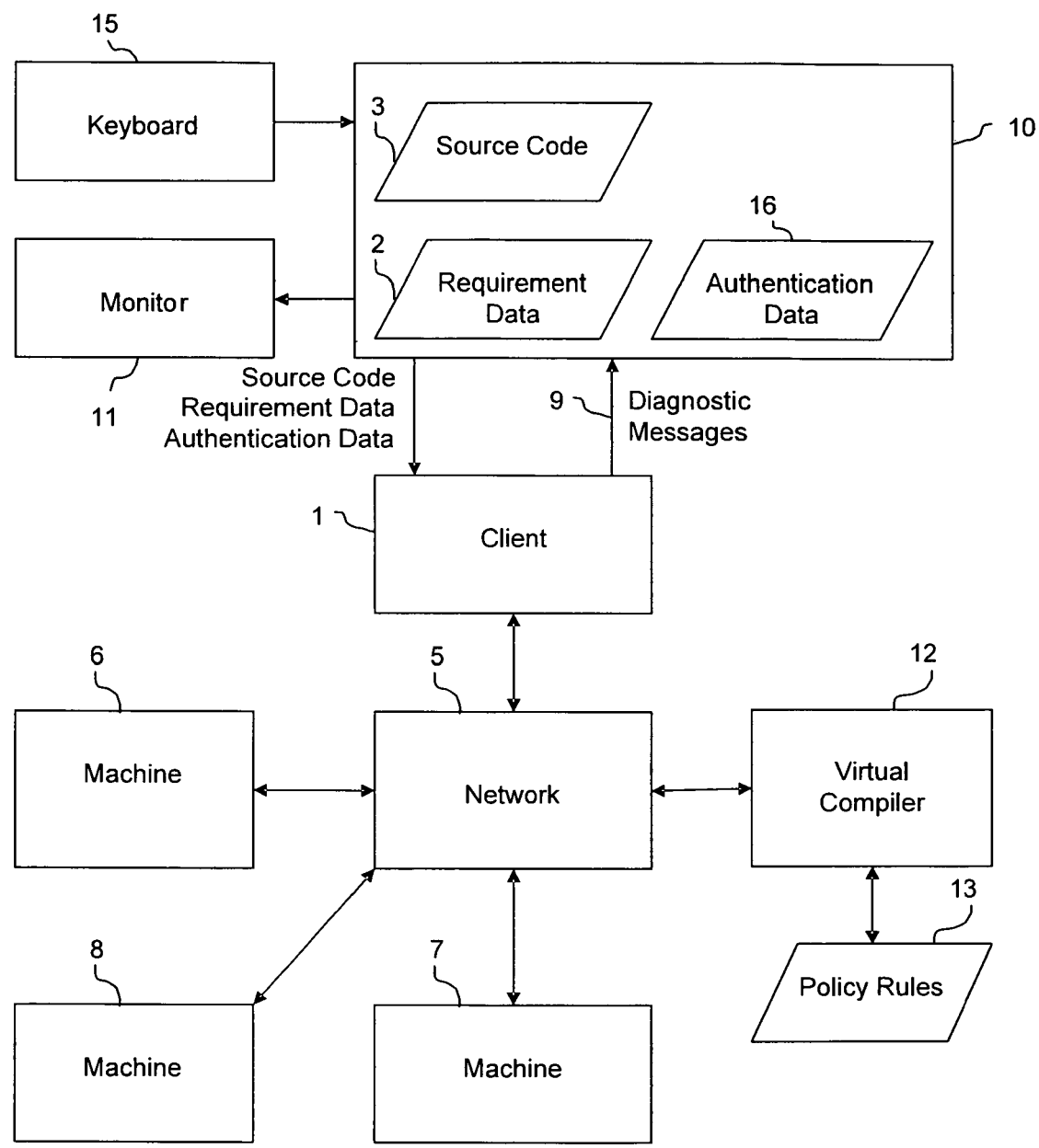
FIG. 4 is a schematic view of a fourth computer system, according to an embodiment of the invention.

A fourth embodiment of a computer system is shown in FIG. 4. Corresponding features are given the same reference numbers as in FIGS. 1, 2 and 3. In this case, no list of machines is maintained by virtual compiler 12. Instead, the virtual compiler 12 is configured to query the network 5 in response to the receipt of a compilation request from the machine 10. This enables the virtual compiler 12 to receive an up to date list of available machines.

Embodiments of the system may be deployed in development environments thereby enabling users to:
- test code across different platform and compiler configurations to ensure portability
- verify code correctness
- double check compiler diagnostics
- get a better understanding of source errors using multiple compilers.

Embodiments of the system may also be employed in a typical migration environment, and in this case enables a user to:
- check target compiler capability
- ensure target compiler compatibility while maintaining source compiler compatibility For a customer, the system can be used to
- check migration and portability issues instantly
- check code portability by compiling on different platforms and using different compilers
- constantly verify compiler behavior for a particular version
- instantly compare compiler features and capabilities online
- instantly verify validity of code using multiple compilers For an internal team, the system helps to
- provide customers with pre-release compilers online for testing and feedback securely
- verify customer bug reports by compiling against different compilers
- verify quality regression by compiling against older versions.

Although the technique has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A method of providing a compiler interface, the method comprising:

generating compiler requirement data at a computer, wherein the compiler requirement data indicates a required compiler and a required platform;

selecting a machine in accordance with the compiler requirement data using a virtual compiler disposed upon said computer, wherein the selected machine is one of a plurality of machines connected to a network, wherein the machine is selected using said virtual compiler disposed upon said computer by querying the network in response to receipt the compiler requirement data, and the machine is selected by said virtual compiler disposed upon said computer on a basis that it has the required compiler installed to run on the required platform; and sending source code by said computer to the selected machine for compilation.

2. A method according to claim 1 wherein the compiler requirement data indicates a required compiler, and wherein the machine is selected by said virtual compiler disposed upon said computer on the basis that it has the required compiler installed.

3. A method according to claim 1 further comprising selecting the machine by said virtual compiler disposed upon said computer in accordance with one or more policy rules.

4. A method according to claim 1 further comprising receiving a diagnostic message at said computer from the machine after compilation.

5. A method according to claim 1 further comprising displaying the diagnostic message at said computer.

6. A method according to claim 1 comprising:
receiving first compiler requirement data at said computer;
selecting a first machine in accordance with the first compiler requirement data using said virtual compiler disposed upon said computer;
sending first source code to the selected first machine for compilation using said computer;
receiving second compiler requirement data by said computer; selecting a second machine in accordance with the second compiler requirement data using said virtual compiler disposed upon said computer; and
sending second source code to the selected second machine for compilation using said computer using said computer.

7. A method according to claim 1 further comprising performing an authentication procedure by said computer with the selected machine.

8. A method according to claim 1 further comprising sending the source code from said computer to the selected machine for compilation via a network.

9. A method according to claim 1 wherein the selected machine is one of a plurality of machines connected to a network; and wherein the source code is sent from said computer to the selected machine via the network.

* * * * *